(12) United States Patent
Mohan et al.

(10) Patent No.: US 7,821,949 B2
(45) Date of Patent: Oct. 26, 2010

(54) FORWARDING PLANE DATA COMMUNICATIONS CHANNEL FOR ETHERNET TRANSPORT NETWORKS

(75) Inventors: Dinesh Mohan, Kanata (CA); David Allan, Ottawa (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 198 days.

(21) Appl. No.: 11/996,561

(22) PCT Filed: Sep. 12, 2006

(86) PCT No.: PCT/US2006/035544

§ 371 (c)(1),
(2), (4) Date: Jan. 23, 2008

(87) PCT Pub. No.: WO2007/033204

PCT Pub. Date: Mar. 22, 2007

(65) Prior Publication Data

US 2008/0219172 A1 Sep. 11, 2008

Related U.S. Application Data

(60) Provisional application No. 60/716,179, filed on Sep. 12, 2005.

(51) Int. Cl.
*G06F 11/00* (2006.01)
(52) U.S. Cl. .............. 370/241.1; 370/241; 370/247; 709/227; 709/228; 709/229
(58) Field of Classification Search .............. 370/241, 370/241.1, 254, 351, 389, 392; 709/227–229
See application file for complete search history.

(56) References Cited

U.S. PATENT DOCUMENTS

| 2003/0018820 | A1 | 1/2003 | Ould-Brahim et al. |
| 2004/0095884 | A1 | 5/2004 | Lee et al. |
| 2004/0098506 | A1* | 5/2004 | Jean ........................... 709/245 |

(Continued)

OTHER PUBLICATIONS

Dinesh Mohan, "OAM Functions and Mechanisms for Ethernet Based Networks", International Telecommunication Union, Dec. 2004.

(Continued)

*Primary Examiner*—William Trost, IV
*Assistant Examiner*—Siming Liu
(74) *Attorney, Agent, or Firm*—Guerin & Rodriguez, LLP; Michael A. Rodriguez

(57) ABSTRACT

Described is a process and system for providing an extensible forwarding plane data communications channel adapted to selectively support operations, administration and maintenance (OAM) activity within one or more different domains of an Ethernet transport network. The data communication channel is established using Ethernet protocol data units forwarded within the forwarding plane, between network elements. The Ethernet protocol data units can be Ethernet OAM frames modified to include an OpCode indicative of a maintenance communication channel. The OAM frames are generated at a selected one of the network elements (source), forwarded along the same network path as the Ethernet frames, and terminate at another network element (destination) associated with a maintenance level identified within the OAM frame. The source and destination network elements can reside on a domain boundary using the Ethernet OAM frames flowing therebetween to relay maintenance communications channel messages.

25 Claims, 11 Drawing Sheets

U.S. PATENT DOCUMENTS

| | | |
|---|---|---|
| 2004/0136713 A1 | 7/2004 | Lim et al. |
| 2004/0165595 A1 | 8/2004 | Holmgren et al. |
| 2004/0184407 A1 | 9/2004 | Pok et al. |
| 2005/0068950 A1 | 3/2005 | Ellis et al. |
| 2005/0099949 A1 | 5/2005 | Mohan et al. |
| 2005/0099952 A1* | 5/2005 | Mohan et al. ............... 370/241 |
| 2005/0099954 A1 | 5/2005 | Mohan et al. |
| 2005/0108401 A1 | 5/2005 | Gonda |
| 2005/0220153 A1* | 10/2005 | Harada ...................... 370/537 |
| 2006/0007867 A1 | 1/2006 | Elie-Dit-Cosaque et al. |

OTHER PUBLICATIONS

International Search Report for international Application No. PCT/US2006/35544 mailed Jun. 19, 2008; 2 pages.

* cited by examiner

FORWARDING PLANE DATA COMMUNICATIONS CHANNEL FOR ETHERNET TRANSPORT NETWORKS

RELATED APPLICATION

This application claims the benefit of U.S. Provisional Application Ser. No. 60/716,179, filed Sep. 12, 2005, entitled "Ethernet Data Communication Channel." The entire teachings of the above application are incorporated herein by reference.

FIELD OF THE INVENTION

The invention relates to communication networks. More specifically, the invention relates to maintenance entity communications in an Ethernet Operation and Maintenance (OAM) domain.

BACKGROUND OF THE INVENTION

With the recent proliferation of computer and communication networks, there is a growing interest in leveraging existing network resources to provide end users with network connectivity on a demand basis. Thus, as an end user's demand for network resources grows or shrinks, the user may choose to add or remove network capacity by procuring connectivity from other entities. These other entities, generally referred to as operators, operate and maintain physical network resources. Other business entities referred to generally as service providers serve as intermediaries between end users and the operators, further simplifying the procurement of network resources for the end user. Management of the network requires coordination between these different entities.

FIG. 1 illustrates a conceptual network configuration 100 in which communications between two local area networks (LANs) 106, 112 is accomplished using a service provider network 118. Such a configuration is useful for interconnecting and extending LANs 106, 112, which typically cover a limited geographic region, such as a home or office. With the service provider network 118, the different LANs 106, 112 may reside on different floors of the same building, within different building of the same campus, or in different cities, states or even countries. One such example of extended LAN operations use a technique referred to as a virtual LAN (VLAN). Thus, Ethernet frames generated by the first user 102 can be forwarded through the first LAN 106 across an interconnecting network 118 and to a second user 114 on the second LAN 112. From the end user's perspective, they appear to be operating on the same LAN. Beneficiaries of such interconnected LANs include business entities, such as large corporations, whose operations span different geographical regions.

The service provider network 118 uses transport technology to relay local traffic, such as Ethernet frames between LANs 106, 112. Transport technologies such as Optical Transport Network (OTN) and Synchronous Digital Hierarchy (SDH) have been developed to provide generic and all-purpose transport containers for moving both voice and data across the network. In order to establish and maintain the underlying network connectivity, such transport technologies typically provide a separate channel for distributed signaling communications and other distributed communications in relation to provisioning, managing and monitoring network resources.

For example, the communications channel can be used for order-wire or voice communications between maintenance entities to coordinate testing and other maintenance activities, such as software downloads. For configurations in which multiple entities are involved in providing end-to-end network connectivity, each entity would benefit from such a communications channel to provision and maintain related network resources under their control. Preferably, communications on such a data communications channel are confined to the managing entity. Thus, each of the different entities may have a respective data communications channel that is isolated from the other entities. Such isolation would be valuable to business operations in which proprietary information may be shared. Leakage of such information to other entities would be undesirable.

With recent interest in deploying Ethernet as a transport technology, a similar capability would be beneficial. However, having evolved in enterprise environments, Ethernet is missing this capability as there was no such need for a separate maintenance channel. Others have proposed using a dedicated virtual local area network (VLAN) for the purpose of an Ethernet data communications channel. When different entities are involved in providing end-to-end network connectivity, they share the same forwarding plane. Separate VLANS would be required for each data communications channel needed by Operators and Service Providers. Moreover, dedicating the VLANs still does not prevent unwanted leakage of information.

SUMMARY OF THE INVENTION

The present invention extends Ethernet OAM functionality by providing a data communications channel within the forwarding plane established between at least two network addressable devices communicating through multiple network elements configured as a network path to support a flow of Ethernet frames. The data communications channel originates at one of the network element and is forwarded along the network path terminating at another of the network elements, such that the data communications channel is established therebetween.

In one aspect, the invention features a process for providing a data communication channel within a communication network having multiple network elements configured in a path to accommodate a flow of Ethernet protocol data units between at least two users. Some of the network elements are associated with different domains. The process includes generating at a first network element an Ethernet protocol data unit having a first symbol indicative of a relationship to the data communication channel. In some embodiments, the first symbol is a data communications channel operational code (OpCode) provided within an OpCode field of the Ethernet protocol data unit. Also identified within the Ethernet protocol data unit is one of the different domains. The Ethernet protocol data unit once generated, is forwarded along the path of network elements and retrieved at a second network element belonging to the identified domain. The data communications channel is established between the first and second network elements by the Ethernet protocol data unit forwarded therebetween. In some embodiments, the protocol data unit includes another symbol indicative of the functionality of the data communication channel. The other symbol can include a sub-OpCode provided within a sub-OpCode field of the Ethernet protocol data unit.

In another aspect, the invention features a system providing a data communication channel between at least two network elements of multiple network elements configured to accommodate a flow of Ethernet protocol data units between at least two end users. At least some of the multiple network elements belong to different domains. The system includes an Ethernet protocol data unit generator associated with a first network element generating an Ethernet protocol data unit having a first symbol indicative of a relationship to the data communication channel and a second symbol identifying one of the different domains. In some embodiments, the first symbol is a data communications channel operational code (OpCode) provided within an OpCode field of the Ethernet protocol data unit, while the second symbol is associated with a maintenance entity for the identified domain. An Ethernet protocol data unit receiver is associated with a second network element also identified by one of the different domains. The Ethernet protocol data unit receiver receives the flow of Ethernet protocol data units and processes the generated Ethernet protocol data unit in response to the second symbol identifying the associated one of the different domains. The system also includes a data communications channel agent forwarding the retrieved Ethernet protocol data unit to an application in response to a first symbol indicating a relationship to the data communications channel. The data communications channel is established between the first and second network elements by the Ethernet protocol data unit forwarded therebetween.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

The invention features a process and system for providing a data communications channel within an Ethernet forwarding plane, the data communications channel being ancillary to a flow of Ethernet frames between the end users. Such a data communications channel is particularly useful in supporting the coordination of maintenance activities between one or more providers of underlying network resources. The exemplary embodiments described herein relate to a data communications channel, referred to as a maintenance communications channel adapted to selectively support operation, administration, and maintenance (OAM) activity within one or more different domains within an Ethernet transport network.

In brief overview, a data communications channel is established using Ethernet protocol data units forwarded within a forwarding plane established between network elements. The Ethernet protocol data units can be Ethernet OAM frames modified to include an operational code (OpCode) indicative of a maintenance communications channel. The OAM frames are generated at a selected one of the network elements (source), forwarded along the same network path as the Ethernet frames, and terminate at another network element (destination) associated with a maintenance level identified within the OAM frame. Preferably, the source and destination network elements reside on a domain boundary. A data communications agent automatically forwards the data communications channel message as required. The data communications channel is thus established using the modified Ethernet OAM frames flowing between the source and destination network elements.

In general, Ethernet OAM protocol and flow identifiers may be used to perform OAM functions in Ethernet networks by enabling network elements to filter OAM frames based on OAM domain and OAM flow identifiers. Ethernet OAM domains and OAM flow identifiers are described in greater detail in U.S. Published Application No. 2005/0099954, filed Jun. 30, 2004 and claiming the benefit of U.S. Provisional Application Nos. 60/518,910, 60/518,920, 60/518,919, and 60/518,912 all filed on Nov. 10, 2003 and U.S. Provisional Application No. 60/535,018 filed on Jan. 7, 2004, all the content of which are incorporated herein by reference.

Figure 1:
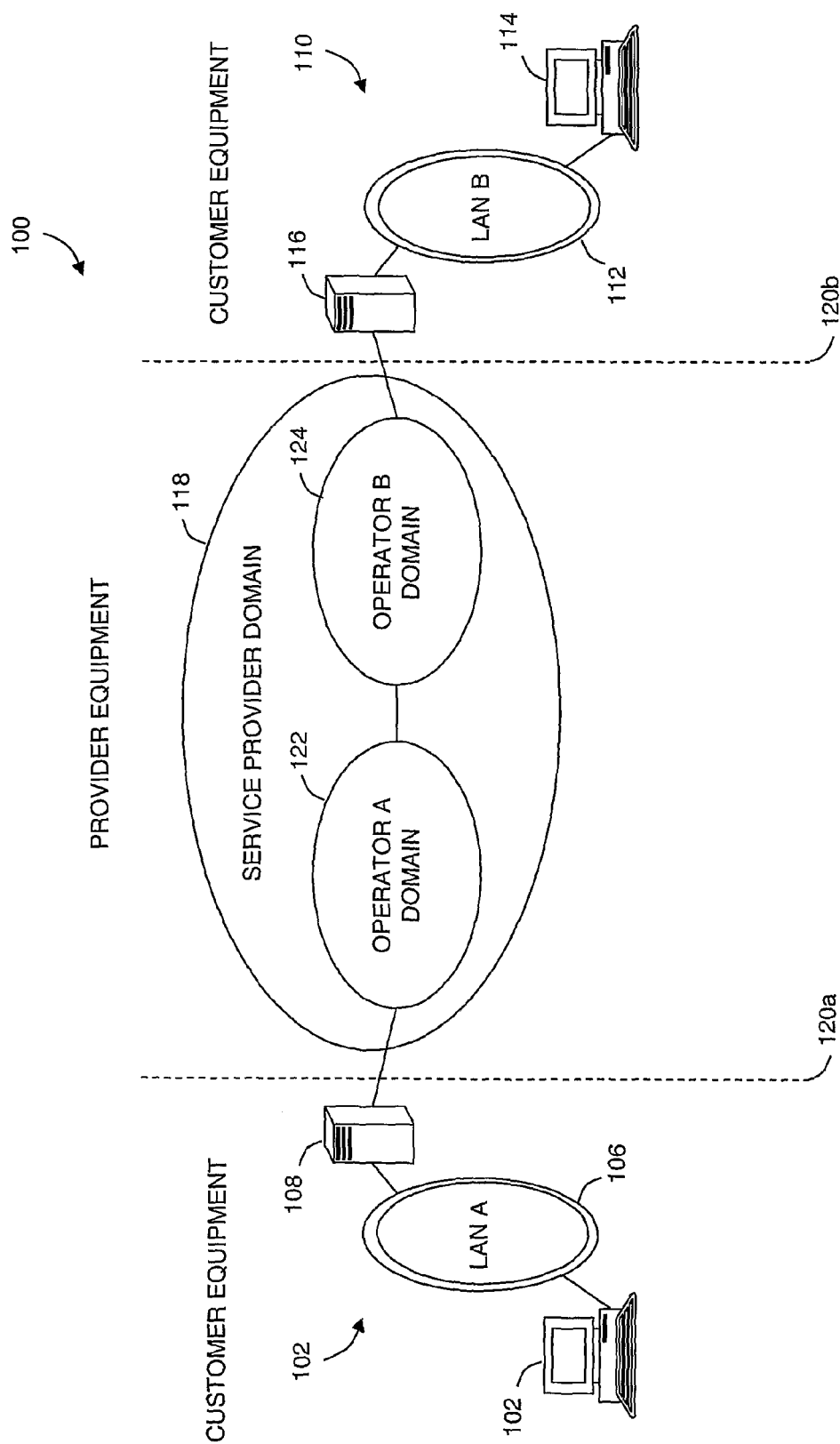
FIG. 1 is a functional block diagram of an exemplary communications network.
Figure 2A:
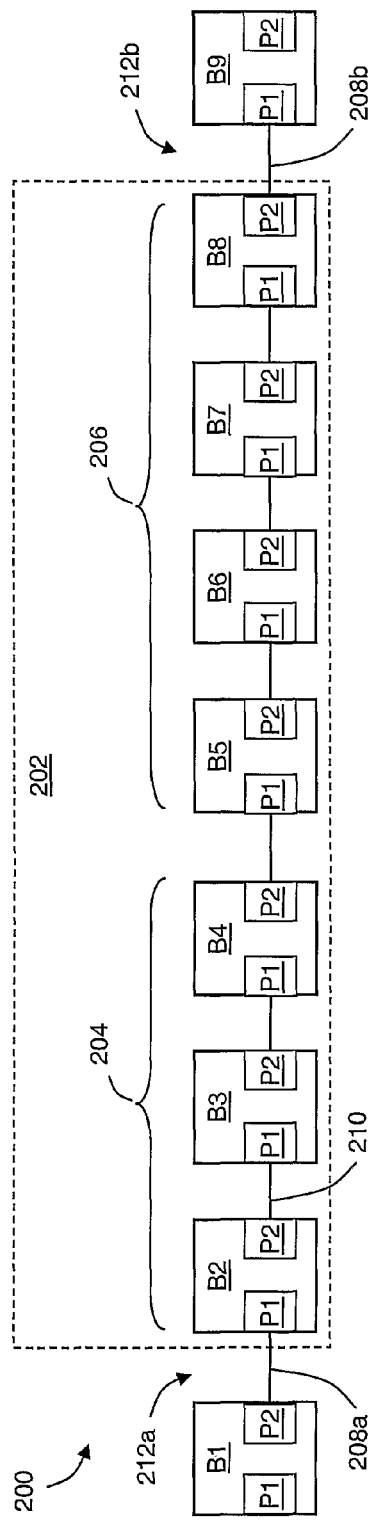
FIG. 2A is a functional block diagram of an exemplary Ethernet transport network according to an embodiment of the invention.

FIG. 2A illustrates an exemplary point-to-point Ethernet transport network 200. The network 200 includes a series of network elements interconnected by physical-layer links 210. For illustrative purposes, each of the network elements is shown as a bridge, although other network elements, such as a router can also be used alone or in combination with bridges. Network segments 210 represent the interconnections between the different network elements B2, B3. One or more of these segments 210 can include wires, fiberoptic cables, wireless links, and combinations thereof. Ethernet frames received at one end of the network 200 are forwarded through the network 200 exiting at the opposite end. Media Access Control (MAC) addresses within the Ethernet frame are used for ultimate delivery of the frame to its intended recipient (e.g., a computer connected to one of the edge bridges B1, B9 through a LAN).

Such a point-to-point Ethernet connection may be configured as a Virtual LAN (VLAN) between end users coupled to the edge bridges B1, B9 at either end of the network 200. Thus, an end user connected through a first LAN to one end of the network 200 communicates with entities on a second LAN located at the other end of the network 200 as though they were sharing the same LAN. Transport of Ethernet frames across the network 200 is handled by a service provider 202. The network resources provided by the same provider 202 and participating in the connectivity is referred to herein as the service provider domain 202.

The edge network element B1, B9 are referred to as customer equipment suggesting that they are managed by the end user rather than the service provider 202. Such edge network elements B1, B9 represent natural points of demarcation at which the service provider 202 delivers network connectivity. Continuing with this example, the serviced provider 202 may choose to provide the network connectivity by engaging network resources from one or more operator networks, Operator A 204 and Operator B 206. The service provider 202 includes provider business entities, such as RCN. Likewise, the Operators 204, 106 can include such business entities as VERIZON and AT&T.

The level of service provided by the service provider 202 to the customer is typically defined within a document commonly referred to as a Service Level Agreement. The service provider 202 may also have a similar agreement in place with each of the operators 204, 206. Thus, the customer equipment B1, B9 is managed by an entity referred to as a customer. The service provider network 202 is managed by an entity referred to as the service provider. Likewise, the operator networks 204, 206 are managed by entities referred to as operators.

With the service level agreement in place, the service provider 202 provides the customer with a single point of contact for all billing and technical issues regarding the network connectivity. The service provider, in turn, deals with each of the different operators 204, 206 independently to obtain respective sub-network connectivity. With each of the entities (customer, service provider, and operator) responsible for different network domains, there is a need to monitor the different domains independently. Beneficially, the Ethernet OAM protocol provides such a feature.

Each of the bridges B1 through B9 has at least two ports P1, P2, which are each interconnected through a physical communications link to a respective port on an adjacent bridge. A link between bridge B3, port P1 and bridge B2, port P2 is referred to as an internal link 210; whereas, a link between bridge B2, port P1 and Bridge B1, port P2 is referred to as an edge link 208a.

Although not shown here, it would be possible for one or more of the links to include additional communications equipment. For example, the edge link 208c between the first and second operator domains 204, 206 may include yet another domain, such as a long haul carrier (not shown). Operator A and B domains 204, 206 may represent metro networks in different cities (e.g., VERIZON and AT&T), interconnected by a long-haul carrier (e.g., SPRINT).

Figure 2B:
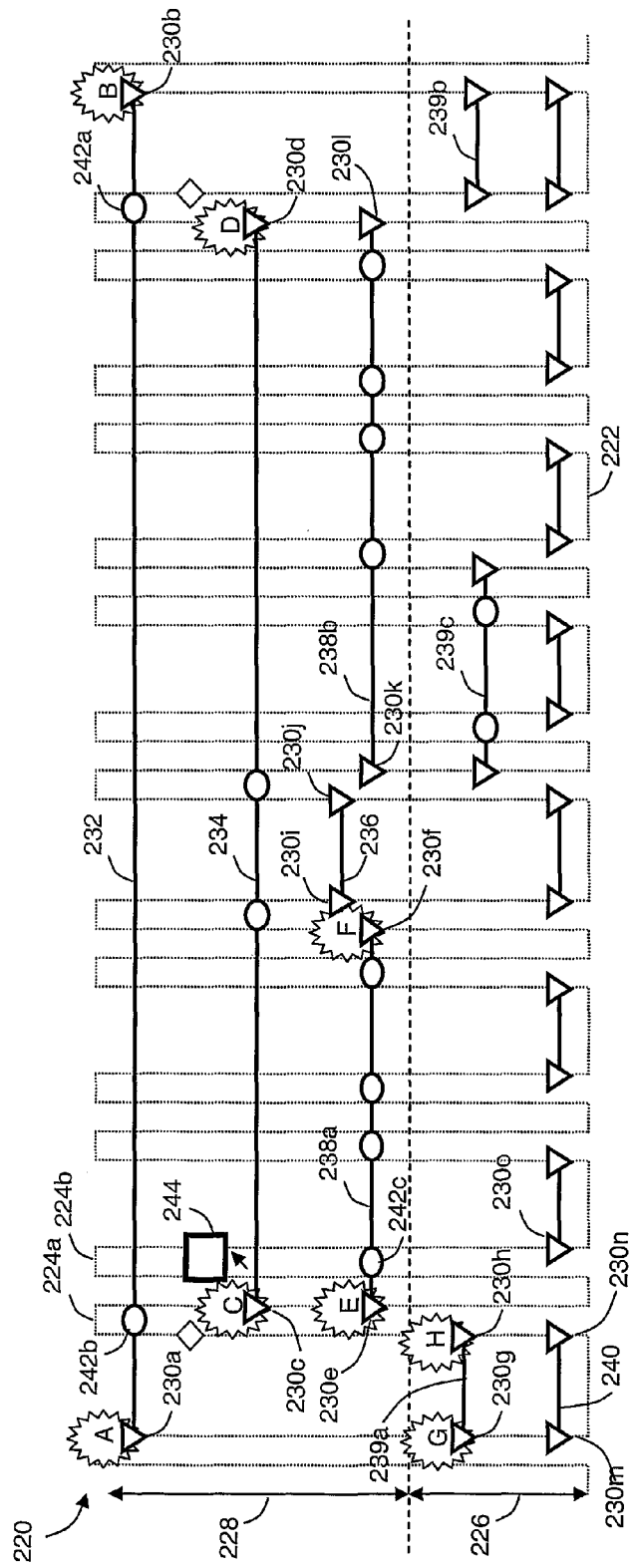
FIG. 2B is a functional block diagram of a forwarding plane for the exemplary Ethernet transport network of FIG. 2A.

FIG. 2B is a schematic diagram of the logical configuration 220 of the network bridges B1 through B9 (FIG. 2A) identifying Ethernet OAM configuration items defined therein. A dotted line represents a path 222 through which Ethernet frames flow (i.e., a forwarding plane). The path 222 extends horizontally through the Ethernet transport network 200 (FIG. 2A), with Ethernet frames entering at either end and progressing along the path 222 toward the opposite end. At each of the bridges B1 through B9, the logical path 222 includes two vertical diversions 224A, 224B (generally 224), each associated with a respective one of the ports P1, P2. The vertical diversions 224 can be loosely divided into different strata, each being associated with one or more of the network entities. Symbols indicative of OAM configuration items are respectively placed along the vertical diversions at the appropriate stratum as described in more detail below.

Ethernet OAM refers to Maintenance Entities (ME) as those entities that require management. For example, the exemplary first operator domain 204 includes bridges B2, B3, B4 (FIG. 2A) representing one such maintenance entity. Similarly, the second operator domain 206 includes bridges B5 through B8 representing another such maintenance entity. The service provider network 202 (FIG. 2A) represents yet another maintenance entity that includes the domains of both of the operators 204, 206. As shown and described, the operator maintenance entities 204, 206 are said to be nested within the service provider maintenance entity 202. For multipoint connectivity, Ethernet OAM describes the concept of Maintenance Entity Groups (MEGs) as including different MEs. For point-to-point Ethernet connectivity, a MEG contains a single ME.

Ethernet OAM refers to Maintenance Entity Group End Points (MEPS) as marking the end points of an Ethernet MEGs. MEPs are capable of initiating and terminating Ethernet OAM frames for fault management and performance monitoring. The OAM frames are distinct from the flow of Ethernet frames. Thus, the Ethernet OAM frames are added to the aggregate of the flow of Ethernet frames and it is assumed that they are subject to the same forwarding treatment as the non-OAM Ethernet frames being monitored.

The triangle symbols located along the flow path 222 represent MEPs 230a through 230o (generally 230) that have been configured within the various network bridges B1 through B9 (FIG. 2A). As shown, some bridges include multiple MEPs 230 within the same port 224. This can result from network configurations having nested domains. Thus, each of the different MEPs 230 in a bridge configured with multiple MEPs 230 is associated with a respective administrative domain (e.g., customer, service provider, operator). Ethernet OAM provides for different MEG levels to allow for the identification and separation of OAM frame flows among the different MEs. Displacement of the MEP 230 along the vertical diversions 224 of the flow path 222 corresponds to an associated MEG level. The lowest layers correspond to an Ethernet physical layer 226, whereas the higher layers correspond to other logical layers 228 including link layer and transport layer.

Horizontal lines drawing between pairs of MEPs 230 represent a flow of Ethernet OAM frames therebetween. Thus, OAM flows can be inserted and extracted at reference points (i.e., MEPs) within the network. Ethernet OAM frames are formed at source flow points and retrieved at termination flow points. According to an Ethernet OAM embodiment of the invention, the OAM flows are initiated at one MEP 230 and terminate at another, each of the MEPs 230 residing within the same MEG level. Thus, each of the flows is associated with one of the MEG levels.

A first OAM flow 232 between MEP 230a and MEP 230b (points A and B) can be referred to as a customer UNI-UNI flow 232. This designation reflects that the reference points (MEPs 230) reside on the customer side of the UNI 212a, 212b. A second OAM flow 234 between MEP 230c and MEP 230d (points C and D) can be referred to as a provider UNI-UNI flow 234. This designation reflects that reference points (MEPs 230) reside on the provider side of the UNI 212a, 212b (FIG. 2A). Other OAM flows 238a, 238b (generally 238) can be referred to as an intra-operator flow 238 because OAM frames flow between reference points on the boundary of an operator network 204, 206. Namely, OAM frames of a first intra-operator flow 238a transit between MEP 230e and MEP 230f (points E and F), each located at the boundary of Operator A network 204. Similarly, OAM frames of a second intra-operator flow 238b transit between MEP 230k and MEP 2301, each located at the boundary of Operator B network 206.

Yet another OAM flow 236 can be referred to as an inter-operator flow 236 because OAM frames flow between reference points on the boundaries of two adjacent operator networks 204, 206. Namely, OAM frames of the inter-operator flow 236 transit between MEP 230i of Operator A bridge B4 and MEP 230j of Operator B bridge B5. Still other OAM flows 239a, 239b, 239c refer to Ethernet physical layer OAM flows. This designation reflects that the reference points (MEPs 230) reside within the physical Ethernet layer.

In general, Ethernet OAM flows can be established between any flow points as required. Advantages of establishing OAM flows as described above is that each of the customer, service provider, and operators can use Ethernet OAM facilities to monitor performance and detect or verify faults within its respective domain. Thus, if an end user or customer detects a loss or degradation of network connectivity, they can use Ethernet OAM to identify which side of the UNI is responsible for the source of the loss or degradation of service. If the customer determines that the source lies within the network, the service provider is contacted and uses an OAM flow to verify the customer's complaint. Likewise, each of the operators uses a respective OAM flow and an inter OAM flow to further isolate the source of any problem. Data communications channels supported within the Ethernet forwarding plane facilitate management of the underlying connectivity without dedicating other network resources not already participating in the forwarding plane.

The circle symbols 242 located along the flow path 222 represent MEG Intermediate Points (MIPs) 242. A MIP 242 represents an intermediate point in a MEG, which is capable of reacting to some Ethernet OAM frames. According to the Ethernet OAM protocol, MIPs 252 neither initiate OAM frames, nor do they take any action to the transit Ethernet flow.

Ethernet OAM standards currently under development do provide for limited resources to assist in performance monitoring and fault detection/verification. These resources include: an Ethernet Continuity Check function (ETH-CC) that can be proactively issued by one MEP 230 to detect any loss of connectivity to another MEP 230; an Ethernet Loopback function (ETH-LB) to verify connectivity with a MIP 242 or peer MEP(s) 230; and an Ethernet Link Trace function (ETH-LT) to retrieve adjacency relationship between a MEP 230 and a remote MEP 230 or MIP 242 and for fault localization by comparing the sequence of MEPs 230 and/or MIPs 242 with that expected from the forwarding plane.

Figure 3:
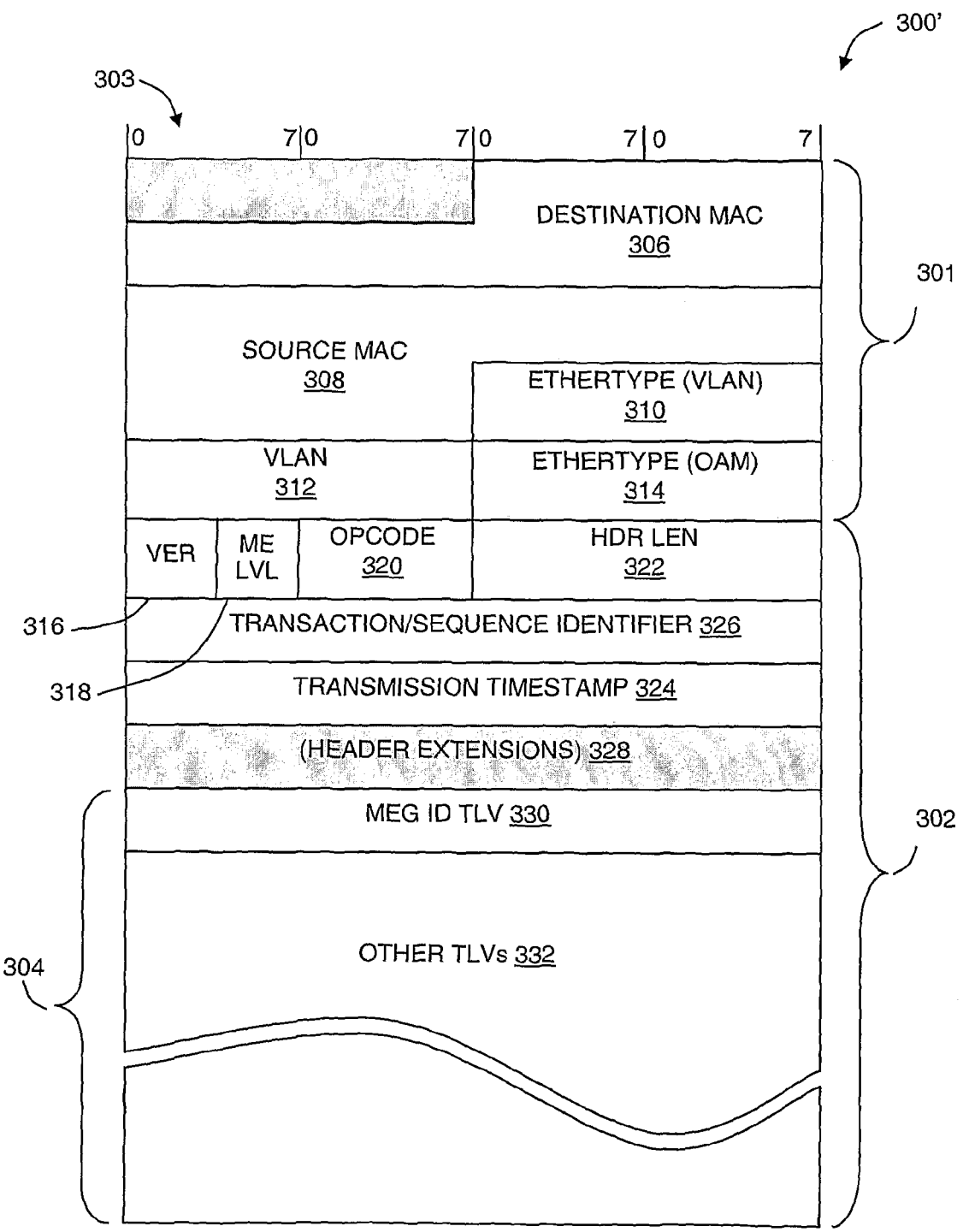
FIG. 3 is a schematic diagram of an exemplary generic Ethernet OAM frame format.

FIG. 3 is a schematic diagram of a generic Ethernet OAM frame 300', similar to that described in a September 2005 draft version of the International Telecommunication Union publication entitled "Draft Recommendation Y.17ethoam—OAM Functions and Mechanisms for Ethernet Based Networks." In general, the frame includes a number of fields arranged into a frame header portion 301 and an Ethernet OAM Protocol Data Unit (PDU) 302. The fields of the Ethernet frame 300' including an Ethernet OAM PDU 302 are described in Table 1A.

TABLE 1A

Fields of the Ethernet OAM Frame/PDU

| Ethernet OAM Field | Description |
| --- | --- |
| DESTINATION MAC 306 | 6-Octet field identifying a unique multicast address or a unicast address of a MEP 230 (FIG. 2B) |
| SOURCE MAC 308 | 6-Octet field typically identifying the unicast MAC address of the source MEP generating the frame 300' |
| ETHERTYPE (VLAN) 310 | Optional 2-Octet field used as a forwarding plane service identifier at the ETH layer |
| VLAN 312 | Optional 2-Octet field identifying a VLAN Tag |
| ETHERTYPE (OAM) 314 | 2-Octet field identifying a unique Ethernet type that identifies OAM frames |
| VER 316 | 4-bit field identifying OAM protocol version |
| ME LVL 318 | 4-bit field identifying the administrative domain (i.e., the maintenance entity level) of the OAM frame (e.g., ranges from 0 to 7: ranges 0-2 identify operator domains; ranges 3-4 identify provider domains; and ranges 5-7 identify customer domains). |
| OPCODE 320 | 1-Octet field identifying the type of OAM frame (e.g., ETH-CC, ETH-LB, and ETH-LT) |
| HDR LEN 322 | 2-Octet field identifying the number of bytes in a fixed-length header |
| TRANSACTION/SEQUENCE IDENTIFIER 326 | 4-Octet field supplied by originator of OAM request and copied in the OAM reply, the semantics of this field being dependent upon the OPCODE |
| TRANSMISSION TIMESTAMP 324 | 4-Octet field identifying the time at which the OAM frame was transmitted from originating MEP |
| HEADER EXTENSIONS 328 | 4-Octet field provided for future extensions |

The OAM PDU 302 also includes an application-specific portion 304 associated with an OpCode function identified by the OPCODE 320 field. The application-specific portion can be further divided into different fields, such as the exemplary fields described below in Table 1C.

TABLE 1C

Application-Specific Fields of the Ethernet OAM PDU

| Ethernet OAM Field | Description |
|---|---|
| MEG ID TLV 330 | optional variable-length used for other type, length, and value associated with the Maintenance Entity Group ID |
| OTHER TLVs 332 | optional variable-length field used for other types, lengths, and values as may be required (e.g., a service ID type, length, and value included when frame associated with service instance) |

Examples of the values that may be assigned to the OPCODE field 320 referenced above are listed in Table 1B. These examples relate to those provided within the September 2005 draft version of the "Draft Recommendation Y.17ethoam—OAM Functions and Mechanisms for Ethernet Based Networks."

TABLE 1B

Exemplary Ethernet OAM OPCODE Values

| OPCODE Description | Value |
|---|---|
| Intrusive Loopback Request | (0x00) |
| Intrusive Loopback Release | (0x01) |
| Intrusive Loopback Reply | (0x02) |
| Non-Intrusive Loopback Request | (0x03) |
| Non-Intrusive Loopback Reply | (0x04) |
| Path Trace Request | (0x05) |
| Path Trace Response | (0x06) |
| Connectivity Check | (0x07) |
| Performance Monitoring Request | (0x08) |
| Performance monitoring Reply | (0x09) |
| Alarm Indicator Signals | (0x0A) |
| Remote Defect Indicators | (0x0B) |
| Vendor Specific for extension of OAM functions in proprietary ways | (0xFF) |

The present invention extends the Ethernet OAM frame functionality by providing a specific Data Communications Channel (DCC) OpCode pair. An OpCode DCC value signals that the Ethernet OAM frame includes a message related to the data communications channel. A new field is also provided within the application-specific portion 304 of the Ethernet OAM PDU 302 providing a sub-OpCode. The sub-OpCode can be used in combination with the DCC OpCode to extend the functionality of the data communications channel without the need for changes within the standardized features of the Ethernet OAM frame.

Figure 4:
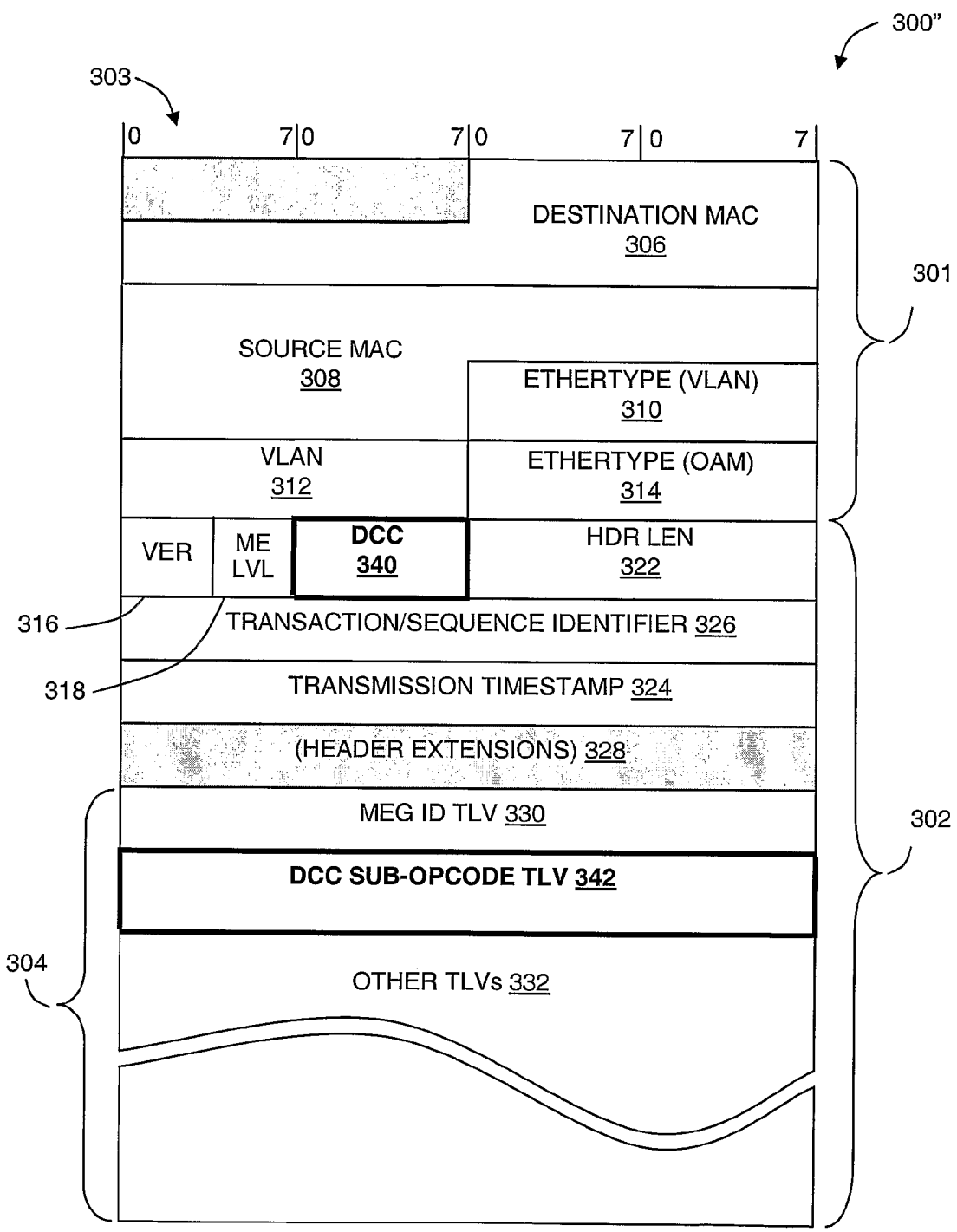
FIG. 4 is a schematic diagram of an exemplary Ethernet OAM frame format including data communications channel functionality according to an embodiment of the invention.

FIG. 4 is a schematic diagram of another Ethernet OAM-enabled frame 300" including within the OPCODE field 320 (FIG. 3) a value or symbol identifying a Data Communications Channel (DCC) 340 OpCode. Ethernet OAM frames 300" including the DCC 340 OpCode will be routed between MEPs 230 (FIG. 2B) and used to establish a data communications channel therebetween.

A MEP 230 recognizing a DCC 340 OpCode within an Ethernet OAM frame 300" passes the frame to a DCC agent 244 (FIG. 2B). The DCC agent 244 examines the DCC 340 OpCode and any related sub-OpCodes to determine the related functionality. Upon determining the functionality, the DCC agent 244 automatically forwards the Ethernet OAM frame 300" to an appropriate application agent. The application agent, in turn, processes the message and, if required, generates a reply message. The application agent automatically forwards the reply message back to the DCC agent 244, which passes it to the MEP 230 for standard Ethernet OAM frame processing. Thus, such a reply message results in the generation of one or more Ethernet OAM frames 300" sent to the originating MEP 230.

In some embodiments, as shown, the OTHER TLVs field 332 of the standard Ethernet OAM frame 300' (FIG. 3) includes a data communications sub-OpCode type, length, and value field 342. Some exemplary uses of the sub-OpCode field 342 are included in Table 2.

In some embodiments, a single OpCode is provided together with a sub-OpCode as described above. Beneficially, a different sub-OpCode is used for each of the functionalities supported between the different maintenance entities. In other embodiments, separate OpCodes are provided for the different functionalities supported between the different maintenance entities.

TABLE 2

Exemplary Sub-OpCodes for Ethernet OAM DCM/DCR

| Sub-OpCode | Description |
|---|---|
| Circuit Test | Checks status information associated with a specified circuit |
| Circuit Configuration Get | Retrieves configuration information associated with a specified circuit |
| Report Port Configuration Get | Retrieves configuration information associated with a specified remote port |
| Circuit Configuration Set | Sets configuration of a specified circuit |
| Remote Port Configuration Set | Sets configuration of a specified remote port |
| MCN | Provides a TMN required maintenance communication network to transport management messages between TMN components |
| SCN | Provides Automatic Switched Transport Network (ASTN) required signaling-communication network to transport signaling messages between ASTN components |
| Remote ATM Management | For example, in an ATM environment, populating Interim Local Management Interface (ILMI) functions allowing UNI management information to be exchanged between UNI management entities, etc. |

The DCC 340 OpCode is provided within the Ethernet OAM PDU 302; whereas, the sub-OpCode is provided within the application specific portion 304 of the Ethernet OAM PDU 302. Such a configuration provides extensibility to the DCC 340 by allowing a user to identify new and various applications without having to first obtain approval from a standards body.

Figure 5:
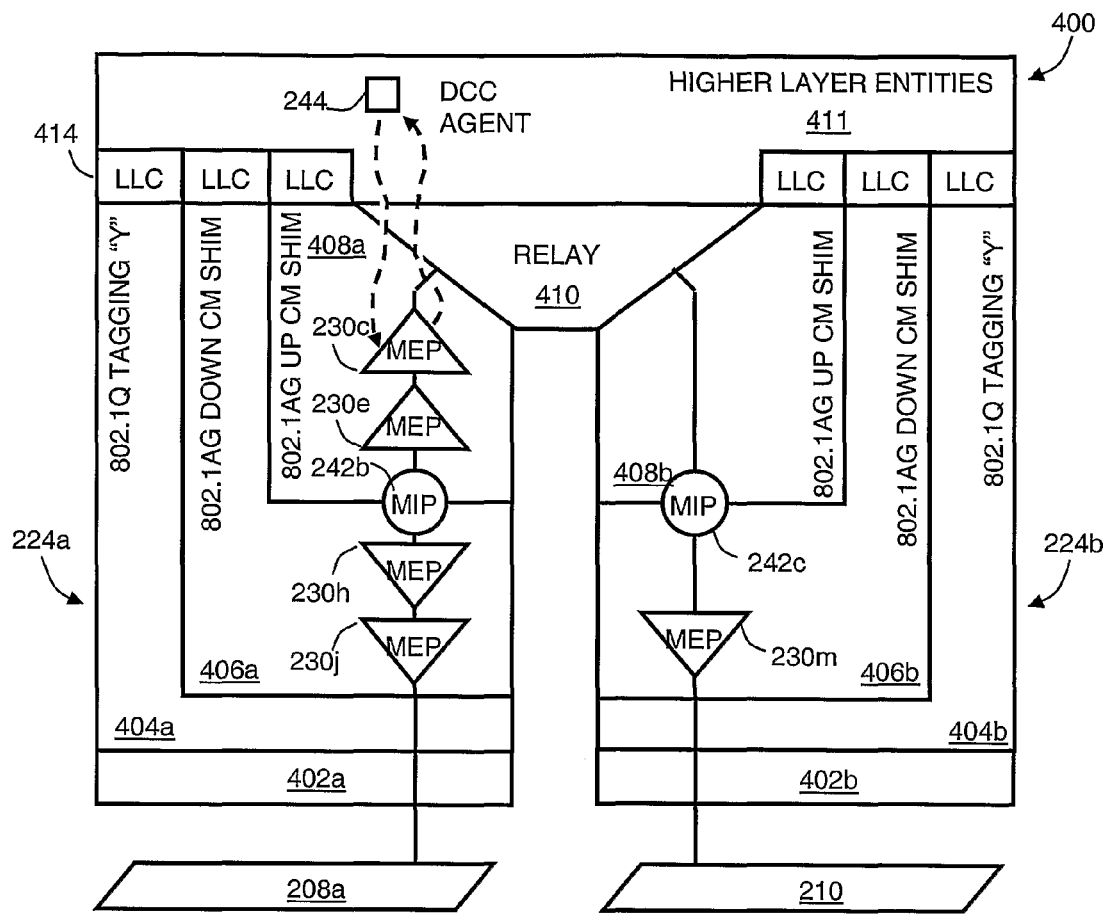
FIG. 5 is a functional block diagram showing in more detail the internal configuration of an exemplary one of the network elements of FIGS. 2A and 2B according to an embodiment of the invention.

FIG. 5 is a schematic diagram showing in more detail a functional representation of the bridge B2 situated at the UNI (FIG. 2A) according to an IEEE Standard 802.1D-2003 "baggy pants" model. Each leg 224a, 224b (generally 224) of the bridge 400 represents a different one of the ports P1, P2. Each leg 224 is segmented into different regions corresponding to internal configuration and protocols supported by the respective port P1, P2. The bottommost protocol regions shown in each leg 402a, 402b (generally, 402) represent the physical-layer protocols, such as ETH layers. Each of these physical layer protocols 402 is in communication with a respective Ethernet link segment 208, 210.

Above the physical layers 402a, 402b are link layer protocols, such as the IEEE 802.1Q Tagging "Y" protocol 404a, 404b. The Ethernet OAM protocol is included within the link-layer protocol. In particular, the Ethernet OAM protocols are implemented as "shims." Thus, the standard Ethernet protocol processes all Ethernet frames. OAM Ethernet frames receive additional processing, as may be required, by the Ethernet OAM protocol shims. In particular, the bridge B2 includes within each leg 224 a downward-facing shim 406a, 406b (generally 406) facing externally from the respective port and an upward-facing shim 408a, 408b (generally 408) facing internally from the respective port. At each port P1, P2, the MEPs 230 can be configured in either shim 406, 408, as required. The MIPs 242 can be configured between the upward and downward shims 406, 408 of each leg, as required.

Additionally, the bridge B2 can be configured with higher-layer entities 411 (applications) that are accessible through Logical Link Controllers (LLCs) 414. A number of LLCs 414 are provided, such that for each port 224, a respective one of the LLCs 414 is associated with the MAC layer 404 and each of the shims 406, 408. The bridge B2 also includes a relay function 410 for relaying Ethernet frames from one port to the other to perform a forwarding function for Ethernet frames within an Ethernet flow.

Also shown are the MEPs 230 and MIPs 242 originally identified with the Operator A bridge B2 shown in FIG. 2B. Associated with the first port P1, first and second outward-facing MEPs 230j, 230h are configured within the downward shim layer 406a. First and second inward-facing MEPs 230e, 230c are configured within the upward shim layer 408a, and a first MIP 242b is disposed between the two shim layers 406a, 408a.

Associated with the second port P2, a third outward-facing MEP 230m is configured within the downward shim layer 406b. There are no inward-facing MEPs configured within the upward shim layer 408b, and a second MIP 242c is disposed between the two shim layers 406b, 408b. Each of the MEPs 230 and MIPs 242 can be configured via a management plane and/or control plane (not shown). Additionally, the management plane configurations can be carried out through manual local administration of each device or via network management systems. As part of the configuration process, each of the MEPs 230 and MIPs 242 is given a ME level. MEPs 230 within an operator or provider domain would generally have a level associated with the respective operator or provider. However, an outward facing MEP 230 located at an edge between another entity, may have a common level negotiated between the two bounding entities.

Figure 6:
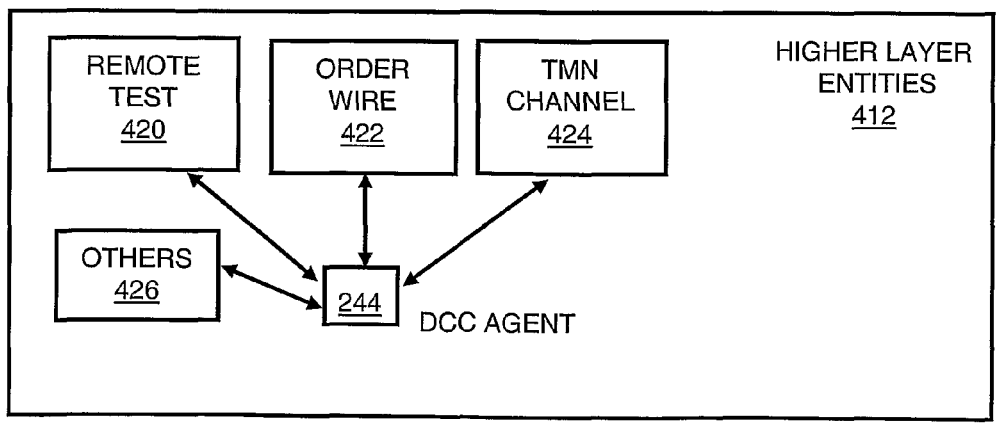
FIG. 6 is a functional block diagram showing in more detail the data communications channel agent of FIG. 5 in communication with exemplary higher-level entities.

The bridge B2 also includes a DCC agent 244 in communication with the MEPs 230. Ethernet OAM frame 300" received by the MEP 230c that includes a DCC OpCode 340 (FIG. 4) are forwarded to the DCC agent 244 for further processing. Referring to FIG. 6, a DCC agent 244 receiving information from an Ethernet OAM frame 300" automatically forwards the received OAM information to a higher-layer entity 412. In some embodiments, such forwarding occurs in response to the sub-OpCode value. Some examples of higher-layer entities that can be used in such a data communications channel include a remote test application 430, an orderwire application 422, a Telecommunications Management Network (TMN) application 424, and other applications 426.

TMN refers a protocol model for managing open systems in a communications network. In particular, the model identifies four functional layers of network management including: (i) Business Management for handling items including billing, account management and administration; (ii) Service Management; (iii) Network Management for providing oversight services to aid in managing major sections of the network; and (iv) Element Management for providing oversight and coordination of the services provided by groups of network elements.

Beneficially, the higher-layer entities or applications used in combination with the DCC can be accessed by the responsible maintenance entity associated with the domain. Thus, operators at either boundary of an operator network or domain can establish a data communications channel within the Ethernet forwarding layer by passing Ethernet OAM frames having a DCC OpCode. Such frames can be originated and retrieved automatically by other applications running on either end of the data communications channel.

By way of illustrative example, a voice orderwire application at a first MEP receives a voice signal, digitizes the voice signal, and partitions the digitized voice into ordered segments. The orderwire application works with the source MEP to generate a stream of Ethernet OAM messages, each including a DCC OpCode, a voice orderwire sub-OpCode, and a respective segment of the digitized voice. The Ethernet OAM messages are forwarded through the Ethernet forwarding plane to a selected MEP. At the recipient MEP, a DCC agent forwards the received messages to a corresponding voice orderwire application that recognizes the voice orderwire functionality, unpacks the digitized voice segments, places them in order, and translates the digital voice message into an analog voice signal.

Moreover, with the layering provided by the Ethernet OAM protocol, it is possible to establish multiple such DCCs for one or more maintenance entities at a single bridge B2. Thus, referring again to FIG. 2B, the exemplary bridge B2 can support a first DCC between points C and D for the service provider 202, a second DCC between points E and F for the respective Operator A 204, and a third DCC between points G and H regarding the UNI. One or more of these DCCs can be used concurrently through Ethernet OAM frames flowing within the forwarding plane, such that the first DCC between points C and D and the second DCC between points E and F can exist simultaneously within the same forwarding plane.

Figure 7:
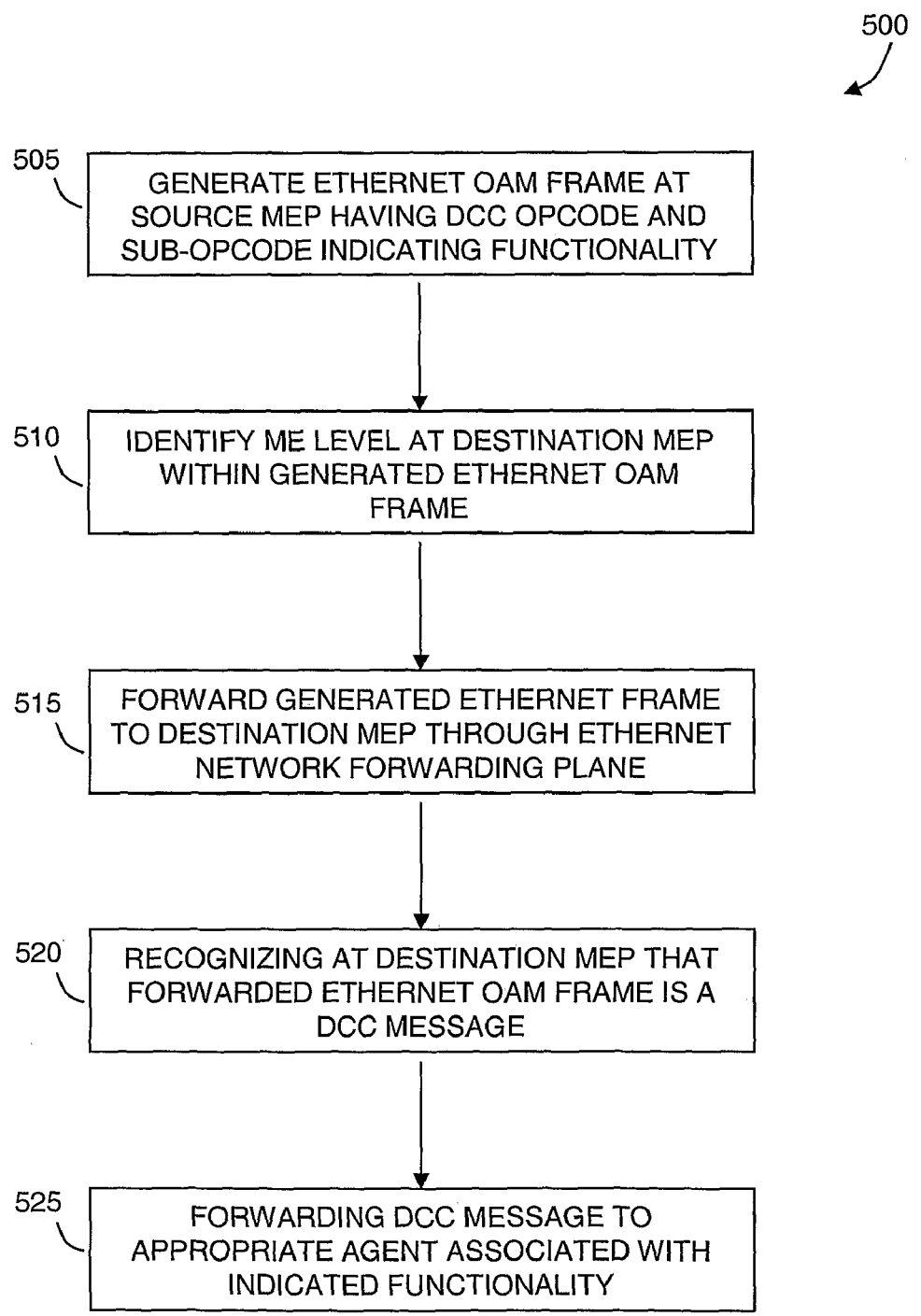
FIG. 7 is a flow diagram of one embodiment of a process for forming Ethernet OAM data communications channel frames.

FIG. 7 is a flow diagram of one embodiment of a process 500 for forwarding a data communications channel using Ethernet OAM protocol between two MEPs 230. An Ethernet OAM frame is generated at a source MEP located within transit path of Ethernet frames at Step 505. This can be accomplished with DCC generator, such as a DCC application associated with the source MEP for generating the Ethernet OAM frames having a DCC OpCode value and optionally including a DCC sub-OpCode indicating functionality associated with the data communications channel. The DCC frame generator also identifies a ME level associated with the DCC termination MEP at Step 510. The suitably generated message is routed using standard Ethernet OAM routing through the Ethernet forwarding plane to the DCC termination MEP at Step 515. At the DCC termination MEP, Ethernet OAM frames associated with the DCC are recognized at Step 520 and forwarded to an application agent associated with the identified functionality at Step 525.

Figure 8:
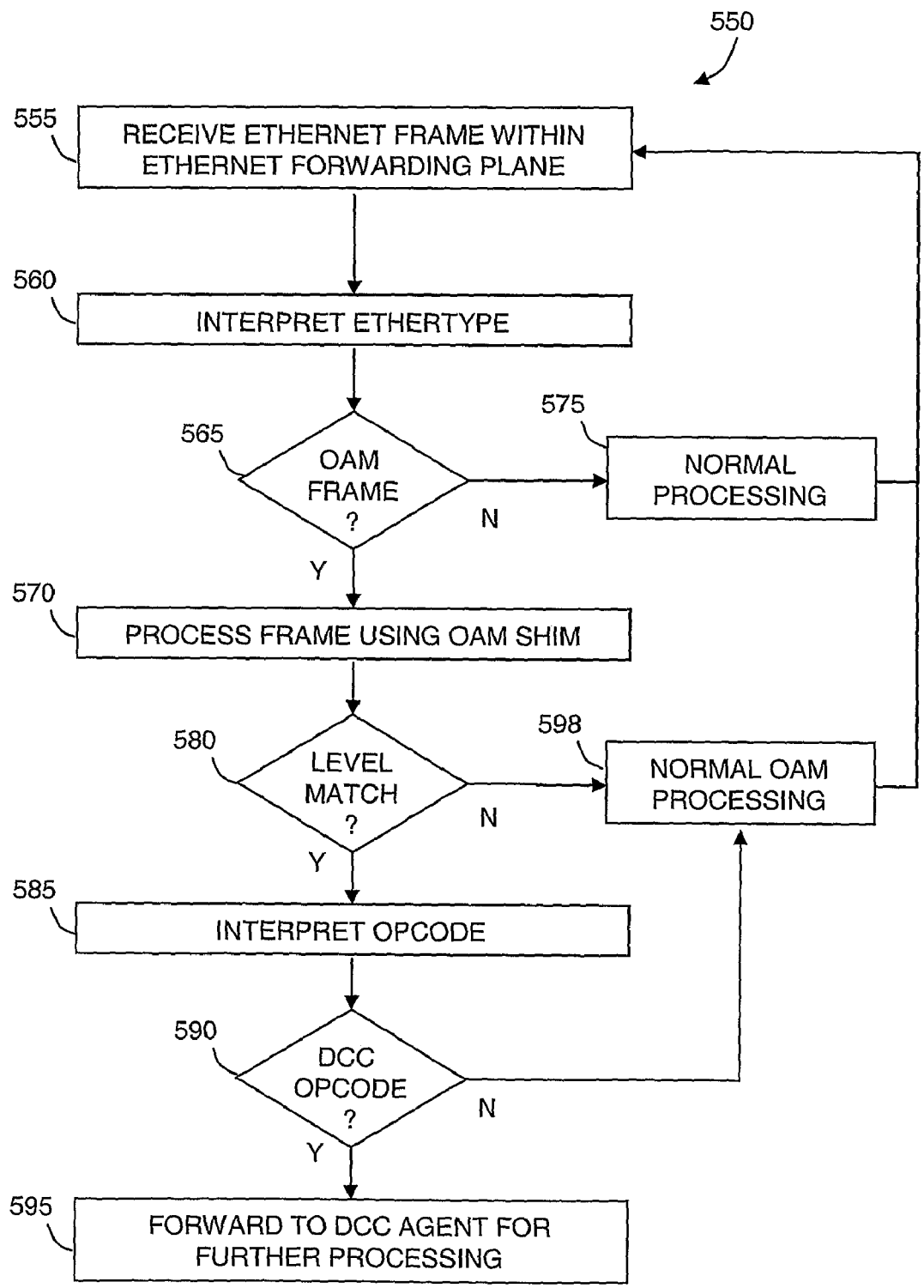
FIG. 8 is a flow diagram of one embodiment of a process for processing received Ethernet OAM data communications channel frames.

FIG. 8 is a flow diagram of one embodiment of a process 550 for receiving Ethernet OAM data communications channel frames. An Ethernet frame in the forwarding plane is received at one of the network elements of an Ethernet transport network at Step 555. In processing the received Ethernet frame through the protocol stack, the Ethernet type field is interpreted at Step 560. If the frame received is recognized at Step 565 as an Ethernet OAM, frame by an Ethertype OAM, the frame is further processed within the OAM shim at Step 570. Otherwise, the Ethernet frame is processed according to normal Ethernet protocol at Step 575.

When processing an Ethertype OAM frame, the message is sequentially processed within the bridge according to the order in which the MEPs 230 (FIG. 5) have been configured. At each MEP 230, the ME level of the received frame is compared to ME level of the MEP 230. Should there be a match at Step 580 with any of the MEPS, the Ethernet OAM frame is further processed by interpreting the OpCode field at Step 585. Otherwise, the frame is passed along to any other MEPs and processed according to normal Ethernet OAM processing at Step 598 (e.g., forwarded along to another network entity). If the OpCode is recognized as a DCC OpCode at Step 590, the Ethernet OAM frame is forwarded to a DCC agent for further processing at Step 595. This can include forwarding the Ethernet OAM frame by the DCC agent to an appropriate application identified by the DCC OpCode value and/or any sub-OpCode values. Otherwise, the Ethernet OAM frame is processed according to normal Ethernet OAM frame processing at step 598. In some embodiments, the process includes an additional step (not shown) of automatically generating a reply Ethernet OAM DCC message in response to processing the received DCC message.

Figure 9:
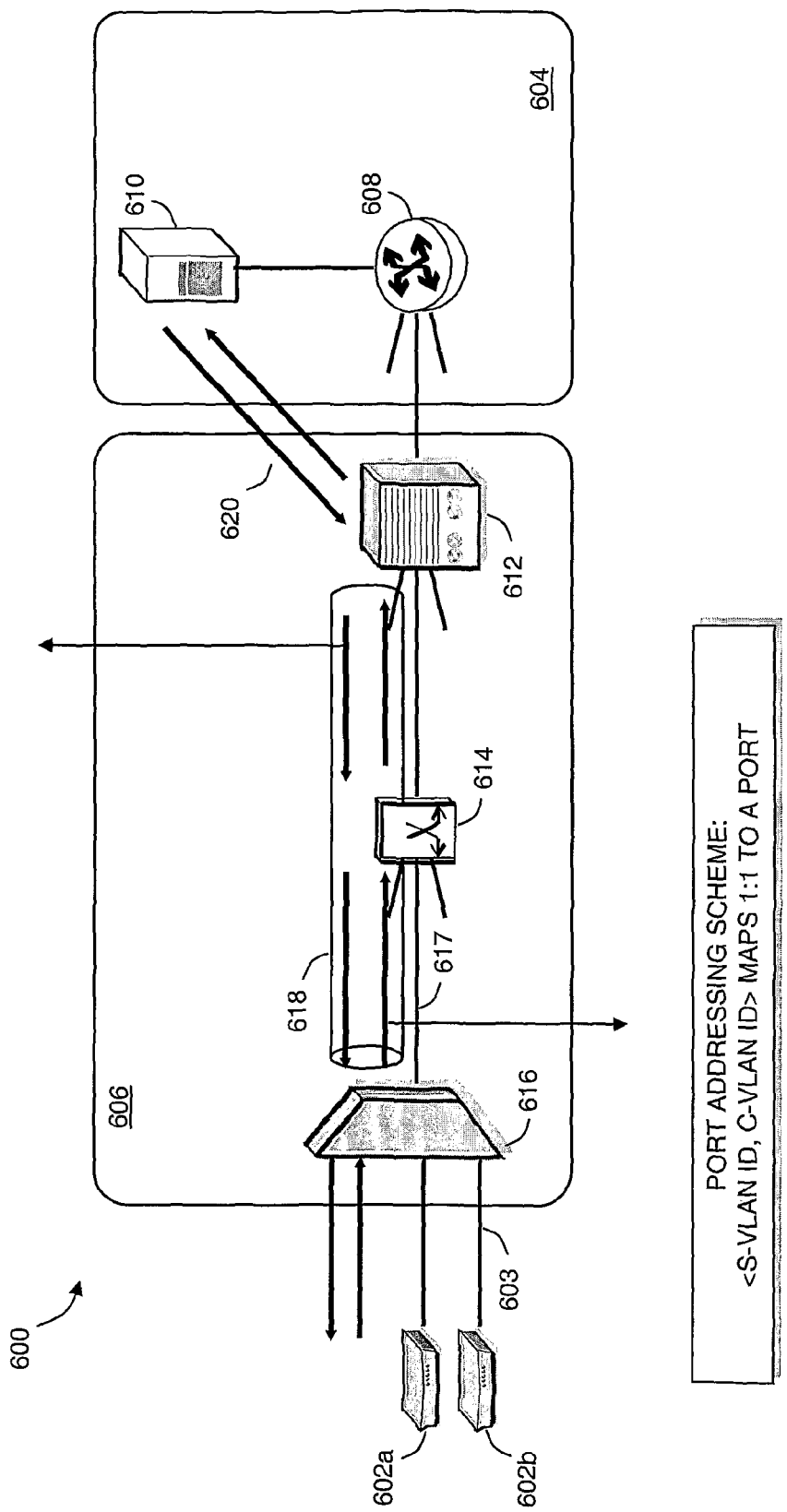
FIG. 9 is a functional block diagram illustrating an application of Ethernet OAM data communications functionality provided within an exemplary communications network.

A functional block diagram of an exemplary network configuration is shown in FIG. 9 by which digital subscriber line (DSL) users remotely access the Internet. In particular, end-user DSL subscribers access the Internet through DSL modems 602a, 602b (generally 602). The DSL modems 602, in turn, are coupled to an access network 606 through a local loop wiring 603. The local loop wiring 603 terminates each DSL modem 602 to an access node, such as a digital subscriber line access multiplexer (DSLAM) 616. The DSLAM 616 multiplexes the multiple DSL subscribers connected thereto onto a high-speed Ethernet backbone 617, which may include one or more internal network bridges 614. The access network 606 also includes a broadband network gateway 612 also coupled to the Ethernet backbone 617.

The broadband network gateway 612 is further coupled to the Internet through an Internet Service Provider (ISP) network 604. The ISP network 604 can include an access device, such as an Authentication, Authorization, And Accounting (AAA)/policy server 610. The AAA/policy server 610 communicates with DSL subscribers through the broadband network gateway 612 to manage access to the ISP network 604. For example, the AAA/policy server 610 may be used to establish a point-to-point protocol link with the DSL subscriber providing access, once authenticated and authorized, to the Internet through an IP router 608.

It is common for the access network 606 to include a separate maintenance channel 618 through which the broadband network gateway 612, typically a Broadband Remote Access Server (BRAS) 612, can request some form of line testing. For example, the BRAS 612 can request line testing to ensure sufficient connectivity to the DSL subscriber to verify the integrity of the access network 606. Beneficially, the maintenance channel 618 can be provided by the data communications channel extension to Ethernet OAM protocol described herein without the need for separate dedicated network resources.

A MEP in the access node 616 receives Ethernet OAM frames arriving via the maintenance channel 618 configured between the access node 616 and the BRAS 612. The Ethernet OAM frames supporting the maintenance channel 618 include the DCC OpCode 340 (FIG. 4) and optionally a DCC sub-OpCode type, length, and value 342 (FIG. 4) indicative of a particular maintenance activity. For example, an Ethernet OAM frame can be generated at the BRAS 612 including a Port Test Message for verifying the integrity of the DSLAM port.

Figure 10:
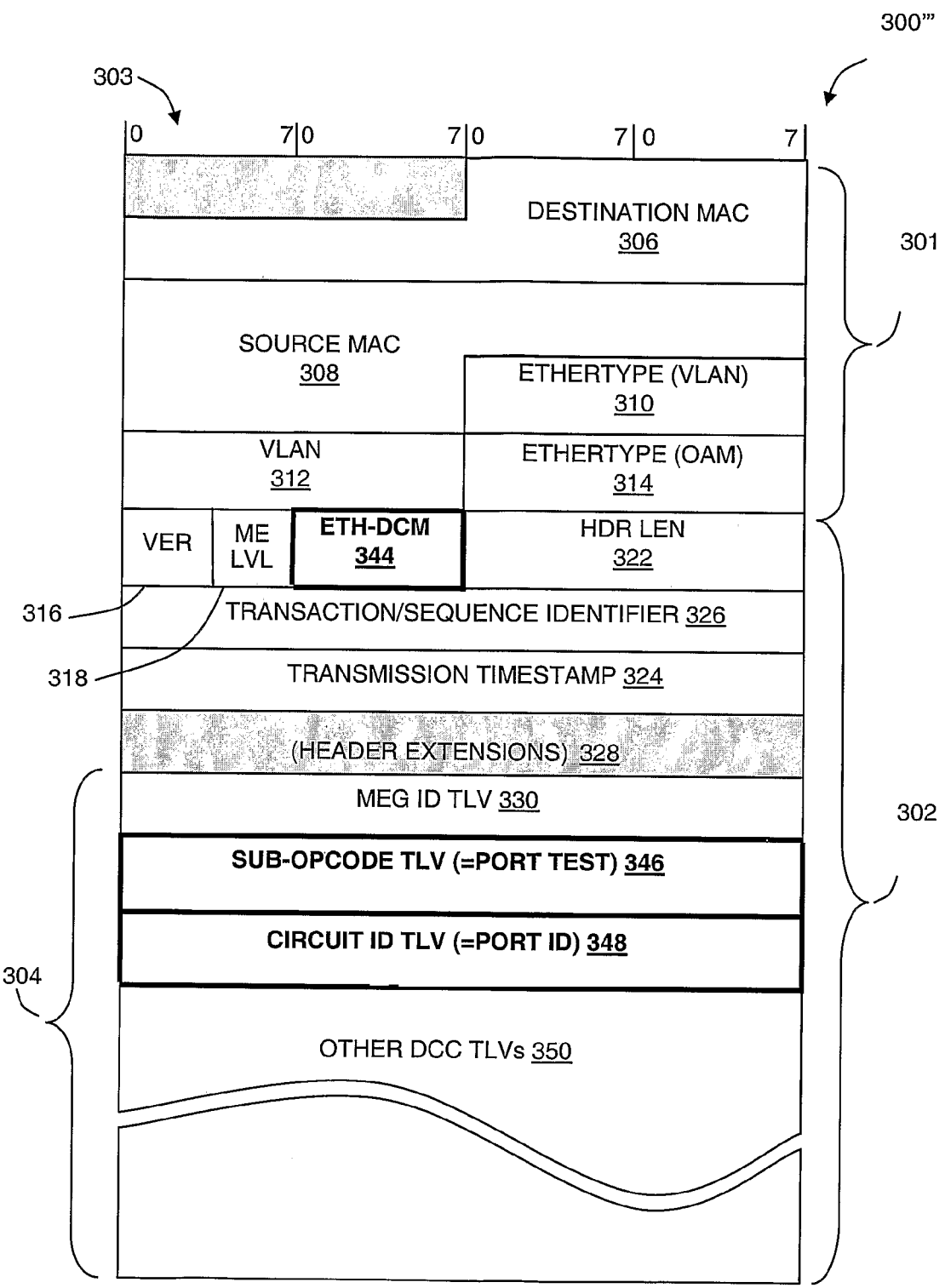
FIG. 10 is a schematic diagram of an exemplary Ethernet OAM frame providing a data communications channel with a port test request message.

FIG. 10 is a schematic diagram of one embodiment of an Ethernet OAM frame 300''' using a sub-OpCode to initiate a Port Test. The Ethernet OAM frame 300''' includes an Ethernet OAM PDU 302 having in its OpCode field an ETH-DCM 344 OpCode together with the appropriate ME Level (ME LVL) 318 of a MEP within the access node 616 to establish the maintenance channel 618. The application-specific portion 304 of the Ethernet OAM PDU 302 includes a sub-OpCode type, length, and value field 346 further identifying that the message is requesting a Port Test at a particular port ID, associated with a particular circuit ID identified by the Circuit ID type, length, and value field 348. Other DCC type, length, and values 350 can be included in the port-test request, as necessary.

Referring again to FIG. 9, the MEP within the access node 616 receives the Ethernet OAM frame and identifies the Port Test Message. The MEP passes the Ethernet OAM frame onto an OAM proxy, also provided within the access node 616 for processing the Port Test Message. Within the access node 616, the network side of the OAM proxy is accessed through end-to-end Ethernet OAM messages. The user side of the OAM proxy (e.g., looking out toward the DSL modems 602) can include other messages, such as point-to-point Asynchronous Transfer Mode (ATM) messages, or Ethernet (EFM) OAM messages.

In some embodiments, the OAM proxy may initiate a complementary OAM procedure on the DSL interface towards the subscriber. The OAM proxy generates an appropriate Port Test Reply based on the results from any complementary OAM procedure and passes it to the MEP. These results may include list of tests performed and status of those tests (e.g., G.992.7 up, I.610 LB fail, etc.). The MEP then sends the Ethernet OAM message including the Port Test Reply to the BRAS 612 through the maintenance channel 618.

Figure 11:
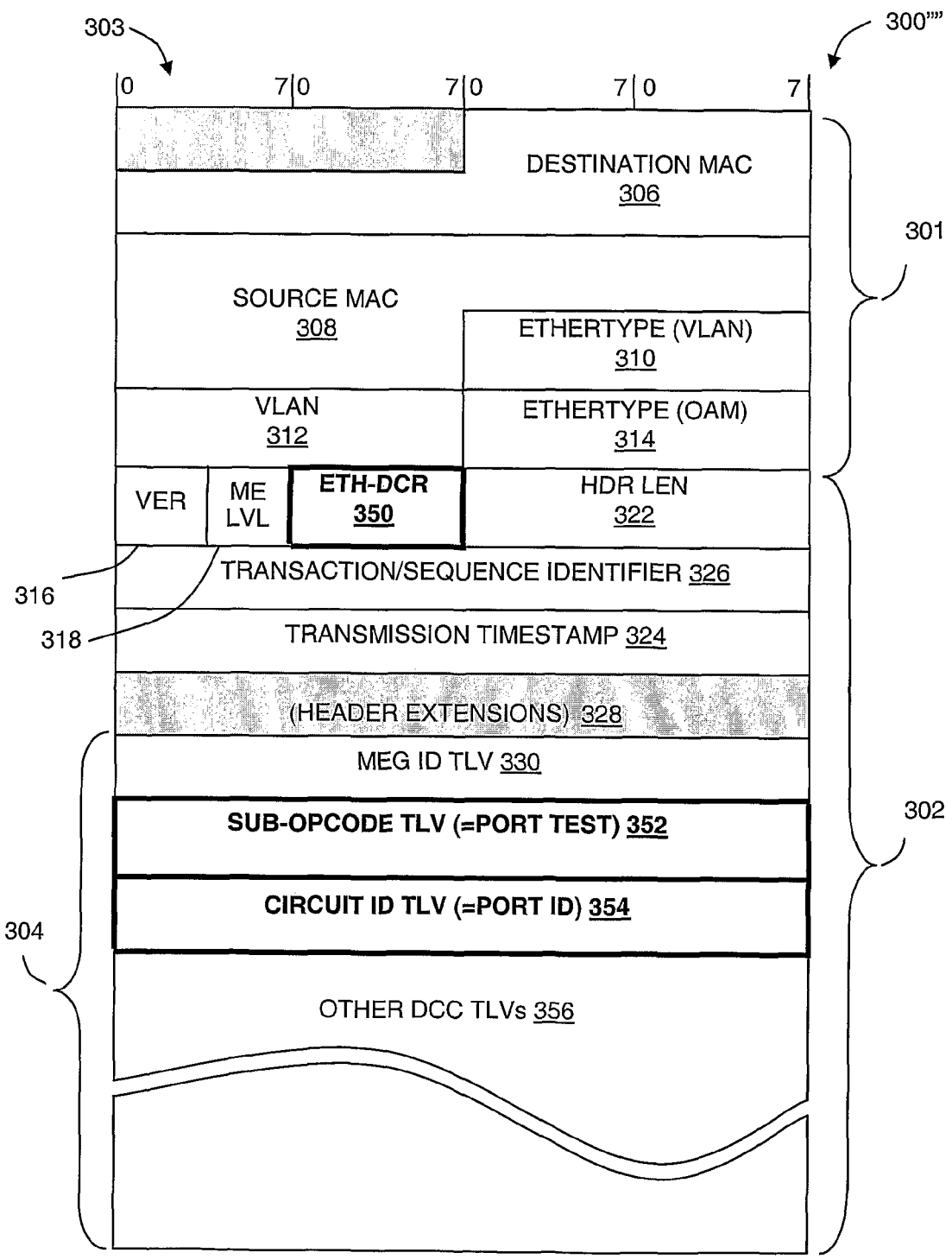
FIG. 11 is a schematic diagram of an exemplary Ethernet OAM frame providing a data communications channel with a reply to port test request message.

FIG. 11 is a schematic diagram of one embodiment of an Ethernet OAM frame 300'''' using a sub-OpCode to initiate a Port Test Reply message. The Ethernet OAM frame 300'''' includes an Ethernet OAM PDU 302 having in its OpCode field an ETH-DCR OpCode 344 together with the appropriate ME Level (ME LVL) 318 of a MEP within the BRAS 612 to establish the maintenance channel 618. The application-specific portion 304 of the Ethernet OAM PDU 302 includes a sub-OpCode type, length, and value field 352 further identifying that the message is replying to a port test performed at a particular port ID, further identified within by a Circuit ID type, length, and value field 354. Other DCC type, length, and values 356 can be included in the reply, as necessary.

Figure 12:
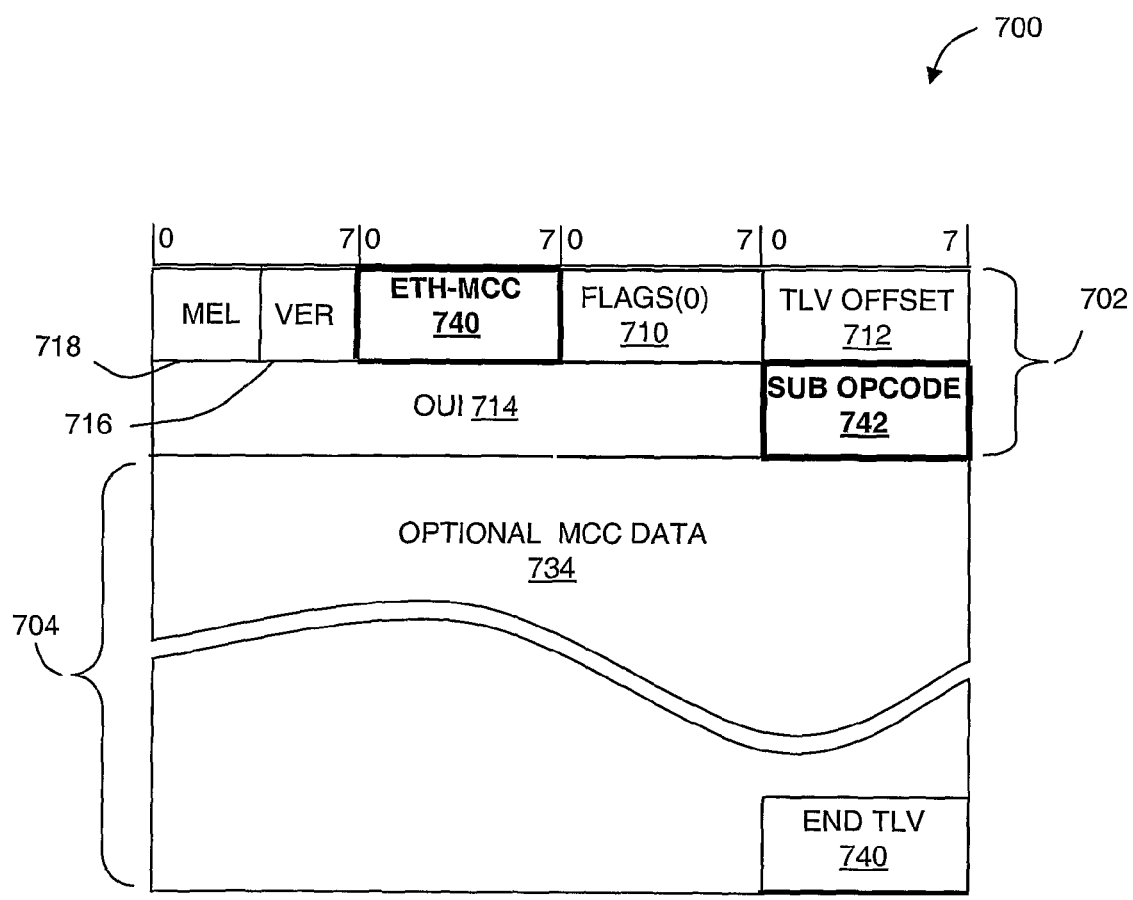
FIG. 12 is a schematic diagram of an alternative embodiment of an Ethernet OAM frame format including data communications channel functionality according to an embodiment of the invention.

FIG. 12 is a schematic diagram of an alternative embodiment of an Ethernet OAM PDU 700 including within its OpCode field an Ethernet Maintenance Communications Channel function identifier (ETH-MCC 740). The ETH-MCC can be used for providing a maintenance communications channel between a pair of MEPs 230 (FIG. 2B). The ETH-MCC function 740 can also be used to perform remote management. A MEP 230 can send a frame with ETH-MCC information to its peer MEP 230 with remote maintenance request, remote maintenance reply, notification, etc. The exemplary Ethernet OAM PDU 700 includes an application-specific portion 704 optionally providing data related to the maintenance communications channel. Table 3 identifies the different fields of the Ethernet OAM PDU 700 according to the pre-published standard Y.1731 of the ITU, entitled "OAM Functions and Mechanisms for Ethernet Based Networks" at the time of this filing.

Specific configuration information required by a MEP 230 to support ETH-MCC 740 includes a MEG Level (MEL 718) at which the MEP 230 exists; a unicast MAC address (Destination MAC 306) of the remote MEP 230 for which ETH-MCC is intended; an Organizationally Unique Identifier (OUI) 714 used to identify the organization defining a specific format and meaning of ETH-MCC; and optionally MCC Data 734 including any additional information that may be needed and is dependent on the specific application (i.e., functionality) of ETH-MCC 740. Also provided within the Ethernet OAM PDU 700 is a Sub OpCode 742 containing a 1-octet field for interpreting the remaining fields in the optional MCC data 734 as may be required, depending upon the functionality indicated by the OUI 714 and organizationally specific Sub_OpCode 742. The optional MCC data 734 may carry one or more TLVs.

TABLE 3

Fields of an Ethernet OAM PDU

| Ethernet OAM Field | Description |
| --- | --- |
| VER 716 | 4-bit field identifying OAM protocol version |
| MEL 718 | 4-bit field identifying the administrative domain (i.e., the maintenance entity level) of the OAM frame (e.g., ranges from 0 to 7: ranges 0-2 identify operator domains; ranges 3-4 identify provider domains; and ranges 5-7 identify customer domains). |
| ETH-MCC 740 | 1-Octet field identifying the type of OAM frame (e.g., ETH-MCC) |
| FLAGS (0) 710 | Set to all-ZEROes |
| TLV OFFSET 712 | 1-byte field |
| OUT 714 | 3-octet field that contains the Organizationally Unique Identifier of the organization defining the format of MCC Data and values SubOpCode |
| SUB OPCODE 742 | 1-octet field that is used to interpret the remaining fields in the MCC PDU |
| OPTIONAL MCC DATA 734 | Depending on the functionality indicated by the OUI and organizationally specific SubOpCode, MCC may carry one or more TLVs. |
| END TLV 740 | All-ZEROes octet value |

A remote MEP 230, upon receiving a frame with ETH-MCC information and with a correct MEG Level, passes the ETH-MCC information to the management agent which may additionally respond.

While the invention has been shown and described with reference to specific preferred embodiments, it should be understood by those skilled in the art that various changes in form and detail may be made therein without departing from the spirit and scope of the invention as defined by the following claims.

What is claimed is:

1. A method for providing a data communications channel within a communication network having a plurality of network elements accommodating a forwarding-plane flow of Ethernet protocol data units between at least two end users, at least some of the network elements being associated with different maintenance domains, the method comprising:

generating, by a maintenance entity at a first network element of the plurality of network elements, an Ethernet protocol data unit having a symbol signifying that the Ethernet protocol data unit includes a message related to a data communications channel;

identifying within the Ethernet protocol data unit a maintenance entity level associated with a termination maintenance entity that is to process the Ethernet protocol data unit;

forwarding the Ethernet protocol data unit along the forwarding plane;

processing the Ethernet protocol data unit by the termination maintenance entity at a second network element of the plurality of network elements in response to the symbol and the maintenance entity level identified in the Ethernet protocol data unit, the data communications channel being established between the maintenance entities at the first and second network elements by the processing of the Ethernet protocol data unit.

2. The method of claim 1, wherein the Ethernet protocol data unit is an Ethernet Operation, Administration and Maintenance (OAM) protocol frame.

3. The method of claim 1, further comprising providing within the Ethernet protocol data unit a supplemental field for identifying a functionality of the data communications channel.

4. The method of claim 3, wherein the functionality provides an orderwire capability between the first and second network elements.

5. The method of claim 4, wherein the orderwire capability is a voice orderwire capability.

6. The method of claim 3, wherein the symbol is provided within a general portion of the Ethernet protocol data unit and the supplemental field is provided within an application-specific portion of the Ethernet protocol data unit.

7. The method of claim 1, further comprising:
generating in response to the processed Ethernet protocol data unit at the second network element a reply Ethernet protocol data unit having a symbol signifying that the reply Ethernet protocol data unit includes a message related to the data communications channel;
identifying within the reply Ethernet protocol data unit the same maintenance entity level identified in the processed Ethernet protocol data unit;
forwarding the reply Ethernet protocol data unit in a direction along the forwarding plane opposite that taken by the processed Ethernet protocol data unit;
processing the reply Ethernet protocol data unit at the first network element in response to the symbol and the maintenance entity level in the reply Ethernet protocol data unit.

8. The method of claim 1, further comprising automatically forwarding at the second network element information from the processed Ethernet protocol data unit to an application.

9. The method of claim 8, wherein the automatic forwarding selectively directs the processed Ethernet protocol data unit to one of a plurality of applications.

10. The method of claim 9, wherein the one of the plurality of applications is selected in response to a value of the symbol.

11. The method of claim 10, wherein the one of the plurality of applications is further selected in response to a value of a supplemental field included within the Ethernet protocol data unit.

12. The method of claim 9, wherein the one of the plurality of applications is selected in response to a value of a supplemental field included within the Ethernet protocol data unit.

13. The method of claim 1, further comprising:
generating at the first network element of the plurality of network elements another Ethernet protocol data unit having a symbol signifying that the another Ethernet protocol data unit includes a message related to a second data communication channel;
identifying within the another Ethernet protocol data unit a maintenance entity level associated with a different termination maintenance entity that is to process the another Ethernet protocol data unit;
forwarding the another Ethernet protocol data unit along the forwarding plane; and
processing the another Ethernet protocol data unit at a third network element of the plurality of network elements in response to the symbol and the maintenance entity level in the another Ethernet protocol data unit, the second data communications channel being established between the first and third network elements by the processing of the another Ethernet protocol data unit.

14. The method of claim 13, wherein the established data communications channels support concurrent communications between the first and second network elements and the first and third network elements.

15. A system providing a data communications channel between at least two network elements of a plurality of network elements configured to accommodate a flow of Ethernet protocol data units, at least some of the plurality of network elements belonging to different maintenance domains, the system comprising:
an Ethernet protocol data unit generator associated with a first network element of the plurality of network elements generating an Ethernet protocol data unit having a first symbol signifying that the Ethernet protocol data unit includes a message related to the data communications channel and a second symbol identifying a maintenance entity level associated with a termination maintenance entity that is to process the Ethernet protocol data unit;
an Ethernet protocol data unit processor associated with a second network element of the plurality of network elements associated with the identified maintenance entity level receiving the flow of Ethernet protocol data units and processing the generated Ethernet protocol data unit in response to the first symbol signifying that the Ethernet protocol data unit includes a message related to the data communications channel and to the second symbol identifying the maintenance entity level; and
a data communications channel agent forwarding the processed Ethernet protocol data unit to an application in response to at least one value provided within the Ethernet protocol data unit, the data communications channel being established between the first and second network elements.

16. The system of claim 15, wherein the Ethernet protocol data unit is an Ethernet Operation, Administration and Maintenance (OAM) protocol frame.

17. The system of claim 15, wherein the at least one value provided within the Ethernet protocol data unit includes the first symbol.

18. The system of claim 15, wherein the Ethernet protocol data unit includes a supplemental field for identifying functionality of the data communications channel, the at least one value provided within the Ethernet protocol data unit including the supplemental field.

19. The system of claim 18, wherein the at least one value provided within Ethernet protocol data unit includes the first symbol.

20. The system of claim 17, wherein the application provides an orderwire capability between the first and second network elements.

21. The system of claim 20, wherein the application provides a voice capability between the first and second network elements.

22. The system of claim 18, wherein the first symbol is provided within a general portion of the Ethernet protocol data unit and the supplemental field is provided within an application-specific portion of the Ethernet protocol data unit.

23. The system of claim 15, further comprising a second Ethernet protocol data unit generator associated with the second network element generating a reply Ethernet protocol data unit in response to the processed Ethernet protocol data unit, the reply Ethernet protocol data unit also having a first symbol signifying that the another Ethernet protocol data unit includes a message related to the data communications channel and a second symbol identifying the same maintenance entity level identified in the another Ethernet protocol data unit.

24. The system of claim 15, wherein the data communications channel at the second network element automatically forwards information from the processed Ethernet protocol data unit to an application.

25. A system providing a data communication channel between at least two network elements of a plurality of network elements configured to accommodate a flow of Ethernet protocol data units, at least some of the plurality of network elements belonging to different domains, the system comprising:

means for generating, by a maintenance entity at a first network element of the plurality of network elements, an Ethernet protocol data unit having a first symbol indicating that the Ethernet protocol data unit relates to the data communication channel;

means for identifying within the Ethernet protocol data unit a maintenance entity level associated with a termination maintenance entity that is to process the Ethernet protocol data unit;

means for forwarding the Ethernet protocol data unit along the path of network elements;

means for processing the Ethernet protocol data unit by the termination maintenance entity at a second network element of the plurality of network elements in response to the symbol and the maintenance entity level identified in the Ethernet protocol data unit the data communications channel being established between the maintenance entities at the first and second network elements by processing of the Ethernet protocol data unit.

* * * * *